INVENTORS
MASSIMO BAER,
JOSEPH O. CAMPBELL

United States Patent Office 3,671,378
Patented June 20, 1972

3,671,378
GLASS FIBER REINFORCED COMPOSITE AND
METHOD OF MAKING SAME
Massimo Baer, Longmeadow, and Joseph O. Campbell, Agawam, Mass., assignors to Monsanto Company, St. Louis, Mo.
Filed Nov. 4, 1969, Ser. No. 873,952
Int. Cl. B32b 5/16; D02g 3/36
U.S. Cl. 161—170          18 Claims

ABSTRACT OF THE DISCLOSURE

Disclosed herein is an improvement in the process for preparing composites from glass fibers and thermoplastic resins which comprises blending the thermoplastic resin matrix with glass concentrate capsules comprising 10 to 80% by weight of glass strands having a length in the range of from 1/32 to 3/4 inch, preferably from about 1/8 to about 1/4 inch, which strands are arranged in a collimated array and encapsulated within a thermoplastic resin matrix, wherein the individual fibers of the strands, the individual strands in the collimated array and the collimated array of glass strands are encapsulated in the thermoplastic resin matrix.

BACKGROUND OF THE INVENTION

(1) Field of the invention

The present invention is directed to an improvement in the process for preparing composites from glass fibers and thermoplastic resins which comprises blending the thermoplastic resin matrix with glass concentrate capsules comprising 10 to 80% by weight of glass fibers arranged in a collimated array and encapsulated within a thermoplastic resin matrix and then thermally processing the thermoplastic resin-glass concentrate capsule blend to form the composites.

(2) Description of the prior art

The use of glass fibers as a reinforcing medium in thermoplastic resin composites is well known in the prior art.

In the preparation of glass fiber reinforced composites it is conventional to use strands of glass fibers which vary in length from 1/32 inch to 3/4 inch or longer. These glass strands are conventionally made up of from 200 to 300 microfibers having a diameter in the order of .00035 inch which are arranged in a parallel configuration. The surface of the glass strand is conventionally coated with a coupling agent and a film forming size which keeps the microfibers together and maintains the integrity of the strand. The glass strands are then dry blended with a thermoplastic resin matrix and fed to an extruder or injection molding machine wherein the fibers are distributed throughout the resin matrix and serve as reinforcing elements in the finished composite.

Dry-blending of the glass and resin matrix is considered to be the simplest, most versatile and economical route for large volume preparation of composites. However, it involves high capital investment for the equipment necessary to avoid the very severe problems of non-uniformity of glass distribution and segregation, debundling, bridging haystacking and matting of glass during blending, feeding and processing. Consequently, special vibrator proportioning and metering feeds are required.

Debundling is the term used to describe that occurrence where the glass strand loses it integrity and the individual microfibers are scattered. Consequently, the loose microfibers would undergo bridging or form haystacking configurations (haystacking) in the hopper which feeds the extruder or injection molding machine. As a result of this haystacking, the desired feed ratio of glass fibers to resin matrix to the molding or extrusion operation would be upset and an inferior product would be produced. Alternately, the haystack would be fed to the machine in the nature of an embolism and would result in matting of the glass fibers and possible clogging of the machinery causing machine breakdown and/or inferior products.

Attempts to solve the problems of debundling and haystacking in the processes for preparing composites have led researchers to coat the glass strand with thermoplastic resin polymers. Bradt, in U.S. Pat. 2,877,501, teaches coating the outside of an endless glass strand with polymeric coating followed by heat treatment to fuse the polymer then cutting the strand to the desired lengths. In this method, the cut ends of the glass strands contain exposed ends of microfibers which are possible sites for subsequent debundling and wicking of water into the composite. Moreover, there is a polymer gradient which decreases toward the center of the strand. Consequently, the individual microfibers in the core of the strand may not be coated with polymer. Thus, the shearing forces of injection molding or extrusion could cause abrasion of the individual microfibers in the core of the strand with resulting damage to these fibers which detracts from their reinforcing ability.

Malinowski et al. in U.S. 2,688,774; Herman et al. in 3,265,644; and Wiczer in 3,278,329 provide a partial solution to the problems mentioned above by coating the glass strand with monomer followed by in situ polymerization to give a single glass strand contained within a thermoplastic resin capsule. In some instances the monomers wet the individual microfibers and upon polymerization provide a coating which helped to protect the microfibers from the adverse effects of abrasion during composite preparation.

However, in the foregoing methods, it is not possible to obtain a high concentration of glass fibers in capsule form which is a desired feature in processes for the preparation of glass filled composites. In many instances, the capsules of the prior art, which contain a single glass strand, rather than a plurality of collimated glass strands, have a different density, size and shape than the particles of resin matrix being fed to the extruder or molding apparatus. These differences may result in segregation of the respective particles during the processing step and a non-uniform product.

Also, it should be pointed out that the physical properties of the glass composites of the prior art have need of improvement. Certain end use applications require composites with greater tensile strength, percent elongation, modulus, heat distortion temperature, Izod impact strength and lower water absorption than is available with the composites of the prior art.

A need exists for an improvement in the process for preparing glass filled composites which would minimize the problems of debundling, haystacking and matting of glass fibers, etc. which are commonly experienced in the processes of the prior art. Furthermore, a definite need exists for an improvement in the process for preparing glass composites which would minimize the problem of glass fiber abrasion during processing. Lastly, a need exists for an improvement in the process for preparing glass composites which will provide composites with improved physical properties.

SUMMARY OF THE INVENTION

The present invention solves the problems and fulfills the needs mentioned above by providing an improvement in the process for preparing composites from glass fibers and thermoplastic resins which comprises blending the thermoplastic resin matrix with glass concentrate capsules comprising 10 to 80% by weight of glass fibers arranged in a collimated array and encapsulated within a thermoplastic resin matrix and then thermally processing the thermoplastic resin-glass concentrate capsule blend to form the composites.

In the capsules used in the improved process of the present invention, the individual microfibers in the strands as well as the strands themselves are also coated with a thermoplastic resin. These capsules, which are prepared in a variety of sizes and shapes, greatly decrease the problem of segregation. The glass concentrate capsules of the present invention allow a significant reduction in the need for the elaborate precautions heretofore used in the processes of the prior art in order to insure a uniform and constant feed rate of glass and resin to the processing machinery. Furthermore, the problems of debundling, haystacking and matting and abrasion of glass fibers which are commonly associated with the glass strands used in the processes of the prior art are virtually eliminated. Moreover, the use of these glass concentrate capsules allows the preparation of composites with improved physical properties such as lower water absorption, higher impact strength, higher tensile strength, higher modulus, improved elongation and heat distortion properties. Furthermore, these improved properties are obtained through a more econocical process.

DESCRIPTION OF THE PREFERRED EMBODIMENTS

Figure 1:
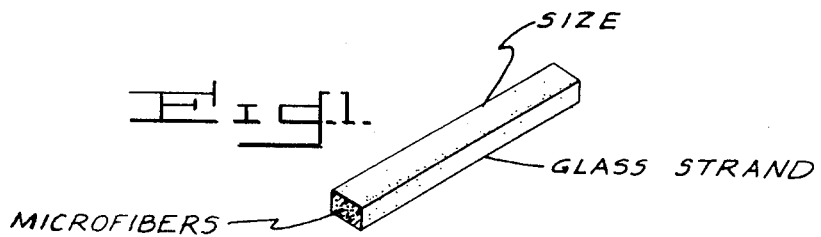
FIG. 1 shows a typical glass strand which comprises a bundle of microfibers bound together by a sizing agent.

The present invention is directed to an improvement in the process for preparing composites from glass fibers and from thermoplastic resin matrix. The improvement involves the use of glass concentrate caspules which comprise a plurality of glass strands arranged in a substantially collimated array within the thermoplastic resin matrix, wherein both the glass strands and the microfibers which make up these strands are encapsulated by the resin matrix. These glass concentrate capsule contain from 10 to 80 parts by weight of glass strands and from 20 to 90 parts by weight of resin matrix based on 100 parts by weight total of glass and resin.

In the preparation of the composite the glass concentrate capsules are blended with a thermoplastic resin diluent and then processed according to conventional means to obtain a composite with improved physical properties.

The glass concentrate capsules are prepared according to the processes outlined in copending applications Ser. No. 873,805 and Ser. No. 874,012, both filed on Nov. 4, 1969. In general, these methods involve suspension polymerization of monomer in the presence of glass fibers using a critical amount of protective colloid and a critical type of agitation. The polymerization is carried out under conditions where there is preferential wetting of the glass fibers by the monomers. This preferential wetting is readily accomplished by first wetting the glass fibers with monomer followed by suspension polymerization. When using those monomers, e.g. vinyl chloride and others, which can easily displace water in the glass strands, the glass may be first wet with water followed by the addition of monomer.

The amount of water used will vary of from 100 to 1600 parts by weight, based on 100 parts by weight total of the glass and monomer. Larger quantities of water can be used but no advantage is gained. The amount of protective colloid used is critical and must be determined for each system. In general, the amount of the protective colloid used will fall in the range of from 0.05 to 2.0% by weight based on the total weight of the glass and monomer.

During the polymerization step the glass strands which are impregnated and coated with monomer align themselves and are subsequently encapsulated by the resulting resin matrix. The glass fibers in the capsules are normally aligned in a substantially collimated array to form cylinders or flat tapes in which the glass strands are butted end to end. The length of the capsules is generally slightly greater than the length of the original chopped strands. The microfibers which form the glass strands are also surrounded by and imbedded in the polymer matrix.

The glass component used in the present invention are strands of glass fibers which vary in length from 1/32 inch to 3/4 inch or longer. Preferably, the glass strands are about 1/8 inch to 1/4 inch long and about 1/16 inch to 3/16 inch wide. The glass strands are preferably sized with material which will become swollen in the monomers used to form the resin matrix without dissolving in the monomers. Moreover, the monomers and the polymers formed therefrom should be compatible with the size used in order to insure that the polymers will have sufficient adhesion to the glass strands.

In general, any monomer or suitable combination of monomers which are polymerizable to a thermoplastic resin are used to form the resin matrix. Examples of monomers which are polymerizable to thermoplastic resins which ay be employed in the practice of this invention include vinyl chloride, vinylidene chloride, styrene, alpha methyl styrene, vinyl toluene, alpha-chlorostyrene, ortho - chlorostyrene, para-chlorostyrene, methchlorostyrene, ortho-methyl styrene, para-methylstyrene, ethylstyrene, isopropyl styrene, dichlorostyrene, vinylnaphthalene, etc. Other suitable monomers would include vinyl esters such as vinyl acetate, vinyl ethers, acrylonitrile, methacrylonitrile, acrylic acid, methacrylic acid, alkyl acrylates and alkyl methacrylates such as methylmethacrylate, methylacrylate, methyl acrylate, ethyl acrylate, propyl acrylate.

In addition, the present invention also contemplates the use of suitable combinations of the foregoing monomers and the use of a suitable rubber component in combination with the foregoing monomers. This rubbery component would include butadiene, neoprene, nitrile rubbers, polyisoprene, polyisobutylene, natural rubbers, acrylonitrile/butadiene/styrene, chlorinated polyethylene, ethylene vinyl acetate copolymers, propylene oxide rubbers, etc. These would include poly-blends, graft copolymers and physical admixtures of a rubbery component with the monomers used to encapsulate the glass. Rubbery compositions are well known to those skilled in the polymer art and need no further explanation here. Also, the glass strands used in the practice of the present invention can first be impregnated with a rubber and then encapsulated.

The preferred monomers for use in the present invention are styrene, methyl methacrylate, acrylonitrile and vinyl chloride. Especially preferred are the use of comonomeric systems such as styrene-acrylonitrile, styrene-acrylonitrile-methacrylic acid and vinyl chloride-vinyl acetate. In these especially preferred systems the amounts of comonomers can be varied over very wide ranges as is well known to those skilled in the art.

Preferential wetting of the glass strands by the monomers is a necessary requirement for successful collimation and encapsulation. If the glass fibers are not wetted by the monomers the resulting polymer scarcely coats the glass. Consequently, only single glass strands are encapsulated and collimation of a plurality of strands does not take place. Moreover, preferential wetting of the glass with monomer encourages impregnation of the glass strands by the monomer which is adsorbed on the microfibers by capillary action. Thus, following polymerization, the individual microfibers as well as the aligned strands are fully surrounded and protected by the resin matrix. Variation in the sizes and shapes of the glass concentrate capsules can be obtained by controlling the polymerization conditions.

The role of the protective colloid in preparing these glass concentrate capsules is very important and certain critical requirements must be met. The choice of protective colloid and the amount used depends on factors such as the length of glass strands, the monomers used for encapsulation, the ratio of glass to monomers and the ratio of water to monomers. The optimum amount of protective colloid is dictated by the size, shape and uniformity desired in the resulting glass concentrate capsule.

In general, when excessive protective colloid is used there is no aligning of the glass strands into a collimated array and only a thin coating of polymer is found on the individual strands. Most of the polymer will be present as fine suspension beads or powders. When insufficient protective colloid is used there is no aligning of glass strands into a collimated array. Moreover, the polymer forms into oversized beads or else complete coagulation occurs. When using an optimum amount of protective colloid, the glass strands are individually coated with polymer and are aligned and butted end-to-end in a substantially collimated array to form capsules which pass through a number 2.5 U.S. Standard Screen and are retained on number 40 screen. Moreover, when using optimum amounts of protective colloid there are little or no polymer fines which indicate that substantially all of the monomer is polymerized around the glass strands.

Examples of protective colloids used in preparing these glass concentrate capsules include those synthetic and naturally occurring material which are well known to those skilled in the art. These include polyvinyl alcohol, partially hydrolyzed polyvinyl acetate, soluble starch, soluble starch derivatives, dextrin, gum tragacanth, gum arabic, gum acacia, gum tragon, gelatin, agar-agar, methyl cellulose, sodium silicate, tricalcium phosphate, salts of polycarboxylic acids such as the sodium salts of polyacrylic acid, partial esters of polymethyacrylic acid, copolymers of acrylic acid and 2-ethyl hexyl acrylate, copolymers of vinylacetate and maleic anhydride and the like.

Especially preferred protective colloids include polyvinyl alcohol, partially hydrolyzed polyvinyl acetate, bentonite, methyl cellulose, partial esters of polymethacrylic acid and copolymers of acrylic acid and 2-ethyl hexyl acrylate which are described in U.S. Pat. 2,945,013 and copolymers of vinyl acetate maleic anhydride.

The amount of protective colloid used is very critical and must be determined for each individual system. The amount of protective colloid used will vary with the specific protective colloid as well as with the amount of glass, monomer and water used in the polymerization step. The length of the glass strands and the type of monomers are other factors which determine the amount of protective colloid used. In this regard it should be noted that larger concentrations of suspending agents are required with longer glass strands and with decreasing monomer/glass ratio.

As a general rule, the amount of protective colloid used will be in the range of from .05 to 2.0% by weight based on the total weight of monomer and glass. Within this range the optimum amount for a given system must be determined by the nature of the other components in the system as well as by the amount of these components. Those skilled in the art will be readily able to determine the optimum amount of protective colloid required for any given system from the teachings set forth in the working examples.

The amount of water used in the polymerization process will vary depending on the weight of the glass and monomers. In general, the amount of water will vary from 100 to 1600 parts by weight, based on one hundred parts by weight of the glass and monomer. In the especially preferred process, where the monomer is present in amounts of from 30 to 80 parts by weight based on a total of 100 parts by weight of glass and monomer, the amount of water used will vary from 100 to 600 parts by weight based on a total of 100 parts by weight of glass and monomer.

The type of agitation used during the polymerization of the monomers is also very critical. Encapsulation and collimation of the fibers is only successfully achieved when using low shear agitation of the type that causes the whole mass to move without causing localized high shear agitation. Attempts to encapsulate glass fibers in an agitated Pfaudler type reactor generally results in considerable debundling of the glass strands with formation of individual fibers which tended to form matted balls and which interfere with the collimation. Suitable agitation may be achieved by tumbling the reactor end-to-end, or in those types of horizontal reactors where the entire mass is moved in a cascading type motion.

In the preferred polymerization process used to prepare the glass concentrate capsules, conventional polymerization initiators and chain transfer agents are used. However, it should be noted that the use of these materials is optional and that the polymerization step may be carried out using heat alone without any polymerization initiator.

The polymerization step is carried out at temperatures of from 0° C. to 150° C. using pressure vessels if necessary. The preferred polymerization temperature is in the range of from 40 tn 90° C. The polymerization step is carried out until a substantial amount of monomer is converted to polymer. The time required will depend on the particular system and polymerization conditions used as well as on the degree of conversion desired.

The glass concentrate capsules used in the present invention comprise from 10 to 80% by weight of glass. More preferably, the capsules comprise from 20 to 70% by weight of glass. Conversely, the capsules comprise from 20 to 90% by weight of thermoplastic resin matrix. More preferably, the capsules comprise from 30 to 80% by weight of resin.

The preferred glass concentrate capsules used in the present invention are those which pass through a number 2.5 U.S. Standard Screen and which are retained on a number 40 U.S. Standard Screen. The more preferred glass concentrate capsules are those that pass through a number 4 screen and which are retained on a number 20 screen.

The glass concentrate capsules weigh about 10 to 350 times more than the average weight of one of the original glass strands used as the starting material. The preferred glass concentrate capsule weigh about 20 to 150 times more than the average weight of one of the original glass strands.

Preferably, at least five (5) to ten (10) glass strands are encapsulated in the glass concentrate capsules of the present invention. As stated above, these are encapsulated in a substantially collimated array within a thermoplastic matrix. The substantially collimated array allows close packing of the glass strands which, in turn, provides a capsule with a high concentration of glass.

The final size, shape and composition of the glass concentrate capsules will depend on the particular system and polymerization conditions used. These properties will be dictated by the particular end use requirements. In general, the capsules are prepared so that they can be blended with a diluent thermoplastic matrix in the form of powder, beads or extruded chips, without encountering problems of segregation or non-uniformity.

The following examples are set forth in illustration of this invention and should not be construed as a limitation thereof. Unless otherwise indicated, all parts and percentages given are by weight.

PART 1

Preparation of the glass concentrate capsule

Example 1.—This example illustrates the preparation of glass concentrate capsules containing about 20 weight percent of glass strands arranged in a collimated array within a styrene-acrylonitrile polymer matrix. The following charge is used in this example:

| Ingredients: | Parts by wt. |
|---|---|
| Chopped glass strands ⅛ inch long | 20 |
| Styrene | 59 |
| Acrylonitrile | 21 |
| Water | 133 |
| Protective colloid | 0.125 |
| Benzoyl peroxide | 0.4 |
| Terpinolene | 0.24 |

The chopped glass strands (Johns-Manville CS–308) are charged to a reactor and the entrapped air is removed by purging with nitrogen. The styrene and acrylonitrile are purged with nitrogen and then mixed with the benzoyl peroxide and the terpinolene chain transfer agent and the mixture is then charged to the reactor under a nitrogen purge. The reactor is then sealed and rotated to completely wet the glass with monomer. After the glass is completely wet by the monomer, nitrogen purged distilled water is charged to the flask along with the protective colloid. The protective colloid used is a copolymer comprising 95.5 mol percent acrylic acid and 4.5 mol percent 2-ethylhexyl acrylate prepared according to the teaching of U.S. Pat. 2,945,013. This colloid is charged to the reactor as a 2% aqueous solution. The reactor is then sealed and rotated end-over-end in a thermostatically controlled water bath at 75° C. for 16 hours. The resulting capsules are then discharged onto a screen and washed with cold and hot water. There is no evidence of polymer agglomeration and there are very few fine polymer particles indicating that substantially all of the monomer has polymerized around the glass fibers.

The resulting glass concentrate capsules pass through a 2.5 U.S. Standard Screen and are retained on a 40 screen. These capsules weigh 30 to 110 times more than the average weight of the ⅛ inch glass strands which are used as the starting material. Examination of a cross section of representative capsules shows a plurality of glass strands in a substantially collimated array wherein the microfibers in the strands are also encapsulated by polymer.

Other representative capsules are heated in a muffle furnace in order to burn off the polymer exposing a plurality of glass strands in a substantially collimated array.

Example 2.—This example illustrates the use of bentonite as a protective colloid in preparing glass concentrate capsules which contain about 20 weight percent of glass strands arranged in a collimated array within a styrene-acrylonitrile polymer matrix.

Example 1 is repeated here except that 0.30 part of bentonite is used as the protective colloid. The bentonite used is further identified as Bentonite KWK which is obtained from the American Colloid Company. This material is charged to the bottle as a 3.5% solution wherein the pH is adjusted to 6 by the addition of 0.5 N sulfuric acid.

The resulting glass concentrate capsules are comparable to those obtained in Example 1.

Example 3.—This example illustrates the preparation of glass concentrate capsules containing about 50% by weight of ⅛ inch glass strands arranged in a collimated array within a styrene-acrylonitrile polymer matrix.

Example 1 is repeated here except that the following quantities are used:

50 parts of ⅛ inch chopped glass strands
37 parts of styrene
13 parts of acrylonitrile
260 parts of water
0.30 part of protective colloid (the interpolymer of acrylic acid and 2-ethyl hexylacrylate used in Example 1)
0.25 part of benzoyl peroxide
0.15 part of terpinolene The resulting glass concentrate capsules pass through a number 4 U.S. Standard Screen and are retained on a number 16 screen. These capsules weight 30 to 200 times more than the average weight of the ⅛ inch glass strands which are used as the starting material. Examination of a cross section of representative capsules shows a plurality of glass strands in a substantially collimated array wherein the microfibers in the strands are also encapsulated by polymer.

Other representative capsules are placed in a muffle furnace in order to burn off the polymer exposing a plurality of glass srtands in a substantially collimated array.

Example 4.—This example illustrates the use of bentonite as a protective colloid in preparing a glass concentrate capsule which contains about 50% by weight of glass strands arranged in a collimated array within a styrene-acrylonitrile polymer matrix.

Example 3 is repeated here except that 1.0 parts of the bentonite of Example 2 is used as the protective colloid.

The resulting glass concentrate capsules are comparable to those obtained in Example 3.

Example 5.—This example illustrates the preparation of glass concentrate capsules containing about 20 weight percent of ⅛ inch glass strands arranged in a collimated array within a styrene polymer matrix.

The general procedures of Example 1 are repeated here except that the polymerization is carried out without a chain transfer agent and the following quantities are used.

20 parts of ⅛ inch chopped glass strands
80 parts of styrene
200 parts of distilled water
0.15 part of protective colloid (the interpolymer of acrylic acid and 2-ethyl hexylacrylate used in Example 1)
0.24 part of benzoyl peroxide The resulting glass concentrate capsules pass through a number 2.5 U.S. Standard Screen and are retained on a number 12 screen. These capsules weigh 40 to 300 times more that the average weight of the ⅛ inch glass strands which are used as the starting material. Examination of a cross section of representative capsules shows a plurality of glass strands in a substantially collimated array wherein the microfibers in the strands are also encapsulated by polymer.

Other representative capsules are placed in a muffle furnace in order to burn off the polymer exposing a plurality of glass strands in a substantially collimated array.

Example 6.—This example illustrates the use of bentonite as a protective colloid in preparing a glass concentrate capsule containing about 50% by weight of glass strands arranged in a collimated array within a styrene polymer matrix.

Example 5 is repeated here except that 0.50 part of the bentonite of Example 1 is used as the protective colloid.

The resulting glass concentrate capsules are comparable to those obtained in Example 5.

Example 7.—This example illustrates the preparation of glass concentrate capsules containing about 50 weight percent of ⅛ inch glass strands arranged in a collimated array within a styrene-acrylonitrile-methacrylic acid polymer matrix.

Example 3 is repeated here except that the following quantities are used:

50 parts of ⅛ inch chopped glass strands
36 parts of styrene
13 parts of acrylonitrile
1 part of methacrylic acid
262 parts of water
0.125 part of protective colloid (the interpolymer of acrylic acid and 2-ethyl hexylacrylate used in Example 1)
0.25 part of benzoyl peroxide
0.15 part of terpinolene The resulting glass concentrate capsules pass through a number 2.5 screen and are retained on a number 40 screen. These capsules weigh 30 to 80 times more than the average weight of the ⅛ inch glass strands which are used as the starting material. Examination of a cross section of representative capsules shows a plurality of glass strands in a substantially collimated array wherein the microfibers in the strands are also encapsulated by polymer.

Other representative capsules are placed in a muffle furnace in order to burn off the polymer exposing a plurality of glass strands in a substantially collimated array. Note that the presence of the methacrylic acid monomer allows the use of smaller amounts of protective colloid while still giving a collimated product.

Example 8.—This example illustrates the use of 0.4 part of a polyvinyl alcohol protective colloid in the preparation of a glass concentrate capsule containing about 50% by weight of glass strands aligned in a collimated array within a styrene-acrylonitrile polymer matrix. The partially hydrolyzed polyvinyl alcohol has a residual acetate content of 30% by weight and a 4% aqueous solution viscosity at 20° C. of 22 centipoises.

The charge and procedure of Example 3 is repeated here. The resulting product is comparable to the glass concentrate capsules obtained in Example 3.

Example 9.—This example illustrates the use of 0.3 part of an interpolymer of 93 mole percent acrylic acid and 7 mole percent 2-ethylhexyl acrylate as the protective colloid in preparing glass concentrate capsules containing about 50% by weight of glass strands aligned in a collimated array with a polymer matrix which is a copolymer of 50% by weight of styrene and 50% by weight of methyl methacrylate.

The charge and procedure of Example 3 is repeated here. The resulting product is comparable to the glass concentrate capsules obtained in Example 3.

Example 10.—This example illustrates the use of 0.17 part of the protective colloid used in Example 1 in the preparation of glass concentrate capsules containing about 50% by weight of glass strands aligned in a collimated array within a polymer matrix which is a terpolymer of 71% styrene/25% acrylonitrile/4% methacrylic acid. Except for the difference in monomers the charge and procedure of Example 7 is repeated here. The resulting product is comparable to the glass concentrate capsules obtained in Example 7. Once again note that the use of methacrylic acid as a comonomer allows the use of lower amounts of the protective colloid.

Example 11.—This example illustrates the use of concentrate capsules using ¼ inch chopped glass strands. The general procedure of Example 1 is followed here except that the following quantities are used.

20 parts of ¼ inch chopped glass strands
59 parts of styrene
21 parts of acrylonitrile
200 parts of water
0.25 parts of protective colloid (the interpolymer of acrylic acid and 2-ethyl hexylacrylate used in Example 1)
0.40 part of benzoyl peroxide
0.24 part of terpinolene The resulting glass concentrate capsules pass through a number 4.0 screen and are retained on a number 20 screen. These capsules weigh 30 to 90 times more than the average weight of the ⅛ inch glass strands which are used as the starting material. Examination of a cross section of representative capsules shows a plurality of glass strands each encapsulated by polymer.

Other representative capsules are placed in a muffle furnace in order to burn off the polymer exposing a plurality of glass strands in a substantially collimated array.

Example 12.—This example illustrates the use of a prepolymer syrup in the preparation of glass concentrate capsules. The charge and procedure of Example 1 is repeated here except that the monomers used in Example 1 are prepolymerized to about 15% conversion. This prepolymer syrup is then used to wet the glass and the polymerization reaction is carried out as in Example 1 except that 0.3 part of protective colloid is used. This larger amount of colloid is found to be necessary when using a prepolymer syrup. The resulting glass concentrate capsules are comparable to those prepared in Example 1.

The following Examples 13 to 15 illustrate the use of termonomers which are capable of interacting with the surface of the glass to improve adhesion of the glass to the matrix. In each example the glass used is commercially available glass strands ⅛ inch long which have been sized with polyvinyl acetate. The general polymerization procedure of Example 1 is repeated here except that the reaction is carried out in a horizontal reactor using 600 parts of water. In each example the resulting products are glass concentrate capsules which are comparable to those obtained in Example 1. The charges used in these examples are tabulated in the following Table I.

TABLE I.—SUMMARY OF CHARGES USED IN EXAMPLES 13 TO 15

| Ingredient | Example | | |
| --- | --- | --- | --- |
| | 13 | 14 | 15 |
| Chopped glass strands | 80 | 80 | 80 |
| Styrene | 56.8 | 56.0 | 56.8 |
| Acrylonitrile | 12.0 | 12.0 | 12.0 |
| Methacrylic acid | 3.2 | | |
| Para-vinyl benzyl alcohol | | 4.0 | |
| 4-vinyl pyridine | | | 3.2 |
| Colloid | 0.125 | 0.125 | 0.125 |
| Benzoyl peroxide | 0.4 | 0.4 | 0.4 |
| Terpinolene | 0.24 | 0.24 | 0.24 |

Example 16.—This example illustrates the preparation of glass concentrate capsules which contain about 30% by weight of glass strands arranged in a collimated array within a vinyl chloride polymer matrix. The following charge is used in this example:

Ingredients: Parts by weight
- Chopped glass strands ⅛ inch long ------ 15
- Vinyl chloride ------ 40
- Water ------ 80
- Methyl cellulose ------ 0.18
- Lauroyl peroxide ------ 0.12

The chopped glass strands (Johns-Manville CS-308) are charged to a reactor and the entrapped air is removed by purging with nitrogen. The vinyl chloride monomer is then charged to the reactor under a nitrogen purge. The reactor is then sealed and rotated to completely wet the glass with monomer. After the glass is completely wet by the monomer, nitrogen purged, distilled water is charged along with the methyl cellulose. The methyl cellulose used as the protective hydroxypropylmethyl cellulose ether, is available commercially as Methocel 90 HG. This material which has a viscosity of about 4000 cps. is prepared by etherification of from 85 to 90% of the available cellulose hydroxyl groups with methyl and hydroxy propyl groups. The reactor is then sealed and rotated end-over-end in a thermostatically controlled water bath at 54° C. for 16 hours. The resulting capsules are then discharged onto a screen and washed with cold and hot water. There is only slight evidence of polymer agglomeration and there are only a few fine polymer particles indicating that most of the monomer has polymerized around the glass fibers.

The resulting glass concentrate capsules which contain about 30% by weight of glass, pass through a 2.5 U.S. Standard Screen and are retained on a 40 screen. These capsules weigh 10 to 30 times more than the average weight of the ⅛ inch glass strands which are used as the starting material. Examination of a cross section of representative capsules shows a plurality of glass strands in a substantially collimated array wherein the microfibers in the strands are also encapsulated by polymer.

Other representative capsules are heated in a muffle furnace in order to burn off the polymer exposing a plurality of glass strands in a substantially collimated array.

Example 17.—This example illustrates the prewetting of the glass with water followed by charging of the monomer to the reaction vessel.

Example 16 is repeated here except that the glass strands are first wet with water followed by charging of the monomers. The resulting glass concentrate capsules are comparable to those obtained in Example 16, except that the glass content is about 27% by weight.

Example 18.—This example is set forth to illustrate the preparation of glass concentrate capsules containing about 43% by weight of glass. The following charge is used:

Ingredient: Parts by weight
- Chopped glass strands ⅛ inch long ------ 25
- Vinyl chloride ------ 40
- Water ------ 120
- Methyl cellulose ------ 0.30
- Lauroyl peroxide ------ 0.12

The general polymerization procedure of Example 16 is repeated here except that the vinyl chloride monomer is charged after the glass has been wet with the water. The resulting capsules are then discharged onto a screen and washed with cold and hot water. There is only slight evidence indicating that most of the monomer has polymerized around the glass fibers.

The resulting glass concentrate capsules which contain about 43% by weight of glass, pass through a 4.0 U.S. Standard Screen and are retained on a 20 screen. These capsules weight 10 to 30 times more than the average weight of the ⅛ inch glass strands which are used as the starting material. Examination of a cross section of representative capsules shows a plurality of glass strands in a substantially collimated array wherein the microfibers in the strands are also encapsulated by polymer.

Other representative capsules are heated in a muffle furnace in order to burn off the polymer exposing a plurality of glass strands in a substantially collimated array.

Example 19.—Example 16 is repeated here except the monomer charge consists of 32 parts of vinyl chloride and 8 parts of vinyl acetate in place of the 40 parts of vinyl chloride used in Example 16. The resulting product is comparable in appearance to that obtained in Example 16.

Example 20.—This example illustrates the preparation of glass concentrate capsules which contain about 30% by weight of ¼ inch glass strands arranged in a collimated array within a poly (vinyl chloride) matrix. The following charge is used in this example:

Ingredients: Parts by weight
- Chopped glass strands ¼ inch long ------ 15
- Vinyl chloride ------ 44
- Water ------ 85
- Protective colloid ------ 0.25
- Lauroyl peroxide ------ 0.12

The protective colloid and the general procedures of Example 16 are used in this example.

The resulting glass concentrate capsules which contain about 32% by weight of glass, pass through a 2.5 U.S. Standard Screen and are retained on a 40 screen. These capsules weigh 10 to 35 times more than the average weight of the ¼ inch glass strands which are used as the starting material. Examination of a cross section of representative capsules shows a plurality of glass strands in a substantially collimated array wherein the microfibers in the strands are also encapsulated by polymer.

Other representative capsules are heated in a muffle furnace in order to burn off the polymer exposing a plurality of glass strands in a substantially collimated array.

PART TWO

Improvement in the process for preparing composites

The many varied techniques for preparing composites from glass fibers and thermoplastic resins are well known to those skilled in the art. In general the glass fibers and thermoplastic resin matrix are blended and then fed to an extruder and pelletized. The glass filled pellets are then fed into conventional molding apparatus. Alternately, the glass fibers and resin matrix are fed to a combination extruder-molding machine such as an Arburg machine. In this apparatus the glass is uniformly dispersed in the molten resin in the barrel of the machine and the mixture is then directly injected into a mold. These conventional methods utilize temperatures above the softening point and below the degration temperature of the resin. These temperatures are usually in range of from 125° C. to 400° C. The pressures used in the extrusion and molding operation will depend on several factors such as the softening point and the melt viscosity of material being processed as well as on the temperatures used and other factors. These pressures are usually in the range of from 50 p.s.i. to 20,000 p.s.i.

The amount of glass in the resulting composite may be varied over a wide range. In general, the amount of glass will be in the range of from 10% to 60% by weight based on the total weight of glass and thermoplastic resin in the composite. More preferably, the amount of glass will be in the range of from 15% to 40% by weight.

In the present invention the glass concentrate capsules described above are blended with a thermoplastic resin matrix and then processed into useful composites The use of these glass concentrate capsules in the improved process of the present invention provides a more convenient and more economical process for preparing composites than other methods previously used in the prior art. Moreover, the physical properties of the composites prepared according to the improved process of the present invention are superior in many respects to the properties of those composites prepared according to the processes of the prior art. The improved properties which are obtained in the final composite include lower water absorption, higher tensile and impact strength, higher modulus and better elongation.

The following Examples 21 to 26 are set forth in order to illustrate the improved properties of composites which are prepared from the styrene containing glass concentrate capsules used in the present invention.

In these examples the composites are prepared by mixing the glass or glass concentrate capsules with a thermoplastic resin matrix. The proportions of ingredients in each example are adjusted so as to provide composites containing approximately 20% by weight of glass. The blended ingredients are extruded on a 1 inch extruder using a single flight vinyl screw having a length to diameter (L/D) ratio of 18. The extrusions are carried out at temperatures of from 425° F. to 450° F., while cooling the hopper with water. The extrudate is air cooled on a long take-off table and chopped into ¼ inch to ½ inch chips in a standard double blade cutter.

Test specimens are injection molded at 450° F. and 700 to 1000 p.s.i. using an oversized orifice in the nozzle. The test specimens are then subjected to the following tests:

Tensile properties

Test specimens (4" x ¼" x ⅒") are prepared by injection molding at 450° F. and 1000 p.s.i. Tensile moduli, fail strength and elongation are determined on a floor model Instron using an extensometer.

Izod impact

Test specimens (2½" x ½" x ⅛") are molded under similar conditions to the tensile specimens except that 700 p.s.i. pressure is used. The specimens are notched with 0.1 inch notch radius and impact strength is determined using a 2 lb. hammer.

Heat distortion

Heat distortion is determined on injection molded 2½" x ½" x ⅛" samples at 264 p.s.i., with a 2" span.

Example 21 (control).—This example is set forth as a control to illustrate the properties of test specimens which contain no glass reinforcing agent. The test specimens are copolymers of styrene and acrylonitrile containing 74% by weight styrene and 26% acrylonitrile. These specimens are prepared according to the above procedures. Test results are tabulated in Table II.

Figure 2:
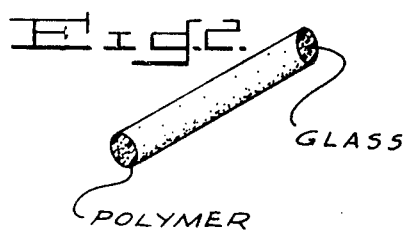
FIG. 2 shows a typical assembly of glass strands of the prior art which is prepared by coating a polymer onto a plurality of endless glass strands and then cutting the resulting coated assembly of strands to the desired length. Note that the ends of the microfibers are exposed providing sites for debundling.
Figure 3:
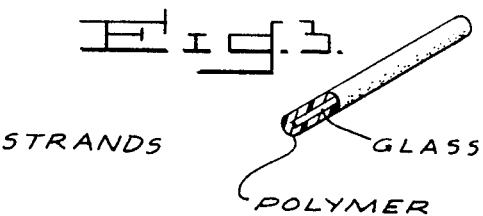
FIG. 3 illustrates encapsulated single strands of the prior art where the glass strand is saturated with monomer which is then polymerized in situ.
Figures 4, 4A:
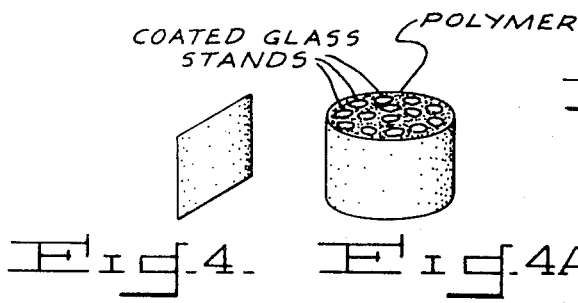
FIG. 4 is a plan view of a glass concentrate capsule of the present invention.
FIG. 4A is a front view of the capsule shown in FIG. 4 with the top of the capsule cut away to expose the ends of the glass strands. Note that the glass strands are aligned in a collimated array which allows a very close packing of the strands to provide a high concentration of glass within the capsule.
Figures 5, 5A:
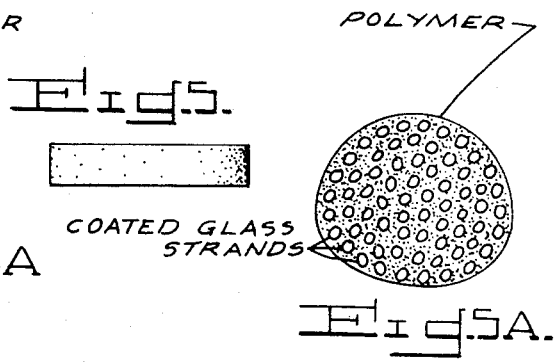
FIG. 5 is a plan of another type of glass concentrate capsule prepared according to the present invention.
FIG. 5A is a top view of the capsule shown in FIG. 5. In this view the top has been cut away to expose the ends of the glass strands. Once again note that the glass strands are aligned in a collimated array which allows a very close packing of the strands to provide a high concentration of glass within the capsule.
Figure 6:
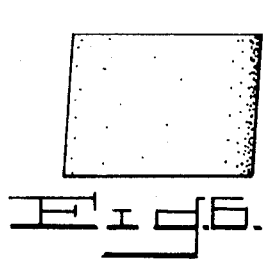
FIG. 6 is a plan view of another type of glass concentrate capsule which is prepared according to the processes of the present invention. This particular configuration is in the form of a flat tape as opposed to the rounded capsules illustrated in FIGS. 4A and 5A.
Figure 6A:
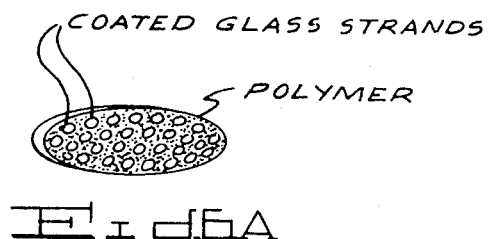
FIG. 6A is a top view of the capsule shown in FIG. 6. Once again note that the glass strands are aligned in a collimated array which allows a very close packing of the strands to provide a high concentration of glass within the capsule.

Example 22.—This example is set forth to illustrate the properties of a composite which is prepared according to a process of the prior art. This example uses coated glass strands of the type illustrated in FIG. 2. These strands are prepared by coating an assembly of endless glass strands with a polymeric coating, fusing the coating and then chopping the coated assembly of strands into the desired length. This assembly of strands is then blended with a thermoplastic resin matrix which is a copolymer of styrene and acrylonitrile containing 72% by weight of styrene and 28% by weight of acrylonitrile. The resin matrix is in the form of rods which are approximately the same size and shape as the coated assembly of glass strands. Composites are formed and tested according to the above procedures. The test results are tabulated in the Table II.

Example 23.—This example is set forth to illustrate the properties of a composite which is prepared according to the teachings of the prior art. In this example plain glass strands of the type illustrated in FIG. 1 are dry blended with a copolymer of styrene and acrylonitrile containing 74% styrene and 26% acrylonitrile. Special precautions are taken to insure proportionate feeding to the extruder in order to avoid the severe problems of glass segregation, non-uniformity of glass distribution, glass debundling during transfer and blending and bridging of glass in the feed hoppers. Composites are formed and tested according to the above procedures. The test results are tabulated in Table II below.

Example 24.—Glass concentrate capsules prepared in Example 1 above are blended with a styrene-acrylonitrile copolymer containing 74% styrene and 26% acrylonitrile. Composites are formed and tested according to the above procedure. The test results are tabulated in Table II below.

Example 25.—Example 24 is repeated here except using the glass concentrate capsules prepared in Example 2. Composites are formed and tested according to the above procedures. The test results are tabulated in Table II below.

Example 26.—Example 24 is repeated here except using the glass concentrate capsules prepared in Example 7. Composites are formed and tested according to the above procedures. The test results are tabulated in Table II below.

TABLE II.—SUMMARY OF EXAMPLES 21 TO 26—PROPERTIES OF COMPOSITES CONTAINING 20% GLASS

| Example [1] | Tensile, p.s.i. $\times 10^{-3}$ | Percent elongation | Modulus, p.s.i. $\times 10^{-5}$ | Heat dist. T., °C. (264 p.s.i.) | Izod impact, ft.-lbs./in. |
|---|---|---|---|---|---|
| 21 (control) | 9.6 | 2.6 | 5.8 | 90 | 0.4 |
| 22 | 13.5 | 1.3 | 10.8 | 103 | 2.1 |
| 23 | 14.2 | 1.6 | 10.9 | 104 | 2.5 |
| 24 | 16.5 | 1.7 | 11.6 | 105 | 2.5 |
| 25 | 16.7 | 1.7 | 11.5 | 105 | 2.5 |
| 26 | 16.5–18 | 1.9 | 11.5 | 107 | 2.5 |

[1] Control sample contains no glass.

(1) Control sample contains no glass.

The data in the foregoing Table II clearly illustrate that composites prepared according to the improved process of the present invention (Examples 24, 25 and 26) have generally superior physical properties than the control sample (Example 21) or those composites prepared according to the processes of the prior art (Examples 22 and 23).

Note that except for percent elongation, the unreinforced polymer of Example 21 has poorer physical properties than those reinforced samples. Note also that the composites prepared according to the improved process of the present invention (Examples 24, 25 and 26) have generally superior tensile strength, percent elongation, modulus and heat distortion than the control samples and the composites prepared according to the teachings of the prior art. The Izod impact strength obtained in Examples 24, 25 and 26 is superior to that obtained in Examples 21 and 22.

In the following Examples 27 to 32 composites containing 20% by weight of glass fibers are prepared from polyvinyl chloride polymers. These composites are prepared and tested according to the above procedures except that the specimens are extruded at 400° F. and molded at 370° F. All of the test specimens are prepared using 1% by weight of Acrawax C lubricant and 1.25% by weight of a tin stabilizer. The poly(vinyl chloride) diluent used in each example is a homopolymer having a weight average molecular weight in the range of from 50,000 to 58,000.

Example 27 (control).—This example is set forth as a control to illustrate the properties of poly(vinyl chloride) test specimens which contain no glass reinforcing agent. The test specimens are prepared according to the above procedures. Test results are tabulated in Table III.

Example 28 (control).—Example 27 is repeated here except that 20% by weight of the poly(vinyl chloride) is replaced by a styrene/acrylonitrile copolymer which contains 74 weight percent styrene and 26 weight percent acrylonitrile. This example is included as a control to illustrate that the presence of poly(styrene-acrylonitrile) upgrades the physical properties of the poly(vinyl chloride).

Example 29.—This example is set forth to illustrate the properties of a composite which is prepared according to the teachings of the prior art. In this example plain glass strands of the type illustrated in FIG. 1 are dry blended with poly(vinyl chloride) homopolymer. Special precautions were taken to insure proportionate feeding to the extruder in order to avoid the severe problems of glass segregation, non-uniformity of glass distribution, glass debundling during transfer and blending and bridging of glass in the feed hoppers. Composites are formed and tested according to the above procedures. The test results art tabulated in Table III below.

Example 30.—Example 29 is repeated here except that about 20% of the poly(vinyl chloride) is replaced by the styrene/acrylonitrile copolymer used in Example 28. This example is set forth in order to further illustrate the superior physical properties that are obtained in composites prepared using the glass concentrate capsules of the present invention.

Example 31.—In this example the glass concentrate capsules prepared in Example 16 above are blended with the poly(vinyl chloride) homopolymer. Composites are formed and tested according to the above procedures. The test results are tabulated in Table III below.

Example 32.—Example 31 is repeated here except using the glass concentrate capsules prepared in Example 18. Composites are formed and tested according to the above procedures. The test results are tabulated in Table III below.

TABLE III.—SUMMARY OF EXAMPLES 27 TO 32—PROPERTIES OF COMPOSITES CONTAINING 20% GLASS

| Example [1] | Tensile, p.s.i. $\times 10^{-3}$ | Percent elongation | Modulus, p.s.i. $\times 10^{-5}$ | Heat dist. T., °C. (264 p.s.i.) | Izod impact, ft.-lbs./in. |
|---|---|---|---|---|---|
| 27 (control) | 7.8 | 3.5 | 4.1 | 71 | 0.7 |
| 28 (control) | 8.0 | 3.1 | 4.4 | 72.5 | 0.56 |
| 29 | 10.1 | 1.4 | 10.8 | 78.5 | 1.2 |
| 30 | 10.6 | 1.3 | 10.4 | 80 | 1.2 |
| 31 | 14.1 | 1.6 | 11.9 | 79.5 | 2.8 |
| 32 | 14.0 | 1.7 | 11.8 | 80 | 2.8 |

[1] The composites in Examples 27 and 28 are control samples which contain no glass. The composites in Examples 29 and 30 are prepared by the prior art method of dry blending glass strands and the thermoplastic polymer matrix. The composites of Examples 31 and 32 are prepared using the glass concentrate capsules of the present invention.

The data in the foregoing Table III clearly illustrate that composites prepared according to the improved process of the present invention (Examples 31 and 32) have generally superior physical properties than the control samples (Examples 27 and 28) or those composites prepared according to the teaching of the prior art (Examples 30 and 31).

Except for percent elongation, the unreinforced polymers of Examples 27 and 28 have poorer physical properties than those reinforced samples. In Example 28, when a styrene/acrylonitrile copolymer is blended with the poly(vinyl chloride) there is a slight increase in tensile, modulus and heat distortion which is accompanied by a decrease in percent elongation and Izod impact. However, the physical properties of this polyblend are still inferior to the glass reinforced polymers.

Examples 29 and 30 are prepared by the conventional prior art method of dry blending glass strands and the resin matrix. These glass reinforced examples have superior physical properties to the unreinforced samples in Examples 27 and 28 except for percent elongation. Note once again that substitution of a styrene/acrylonitrile copolymer for part of the poly(vinyl chloride) gives rise to a difference in some of the physical properties. In this regard note that Example 30 has slightly better tensile and heat distortion than the corresponding Example 29 which does not contain a styrene/acrylonitrile copolymer. However, the properties of these samples are still inferior to those samples prepared from the glass concentrate capsules of the present invention.

Examples 31 and 32, which are prepared using the improved process of the present invention, are definitely superior in tensile, modulus, heat distortion and Izod impact to those samples which do not contain any glass reinforcing element (Examples 27 and 28). Examples 31 and 32 are also superior to Examples 29 and 30, the glass reinforced composites prepared by the dry blending procedure of the prior art, in regard to tensile, percent elongation, modulus and Izod impact.

The superior tensile, modulus and Izod impact results which are obtained using the improved process of the present invention (Examples 31 and 32) are surprising in view of the fact that prior attempts to reinforce poly(vinyl chloride) with glass have been met with considerable difficulty. Consequently, it was believed that the physical properties of poly(vinyl chloride) could not be upgraded to the same extent by glass fibers as the styrene homopolymers and copolymers. Poly(vinyl chloride) presented a problem in that the adhesion between the poly(vinyl chloride) and the glass was less than desirable. Furthermore, it was believed that the processing conditions required for poly(vinyl chloride)/glass composites caused abrasion and subsequent degradation of the glass fibers. Consequently, the glass fibers lost much of their reinforceability during the processing step.

The improved process of the present invention goes a long way to solving the foregoing problems. In the glass concentrate capsules used in the improved process of the present invention there is better wetting of the glass by the monomer. This leads to better adhesion of the poly(vinyl chloride) matrix to the glass and subsequent encapsulation of the individual fibers within the glass strands which are all encapsulated with poly(vinyl chloride) and arranged in a collimated array.

Even more significant improvements in reinforcing vinyl chloride polymers are obtained by the improved process of the present invention by using glass concentrate capsules wherein the resin matrix is a more rigid polymer with a glass transition temperature ($T_g$) greater than 105° C. A further requirement is that the resin matrix in the glass concentrate capsules should have a solubility parameter close to that of the vinyl chloride polymer. More particularly, the solubility of the encapsulating resin should have a solubility parameter within 1.0 unit of that of the vinyl chloride polymer. In the case of vinyl chloride homopolymers, which have a solubility parameter of 9.5, the encapsulating resin used in the glass concentrate capsules should have a solubility parameter in the range of from 8.5 to 10.5 and more preferably from 9.3 to 9.7.

Solubility parameters are well known to those skilled in the art. The solubility parameter can be calculated by a consideration of the contribution made by each of the groups of the subject compound, or it can be determined experimentally by noting the amount of swelling of a cross-linked form of the compound which occurs when it is treated with solutions of known solubility parameters. The former technique is described by J. A. Brydson in the December 1961 issue of the Journal of Plastics, page 107, which refers to the work of P. A. Small reported in the Journal of Applied Chemistry, 1953, Vol. 3, page 71. K. C. Baranwal describes a method of the latter type in an article entitled "Cohesive Energy Densities of Elastomers" in Macromol. Chem., 1967, Vol. 100, page 242.

The preferred encapsulating resins used in the preparation of glass concentrate capsules which may be used to reinforce vinyl chloride polymers would include copolymers of styrene and acrylonitrile having an acrylonitrile content of from 18 to 32% by weight.

The amount of more rigid polymer used with the vinyl chloride polymer may be varied over a wide range. In general the amount of rigid polymer in the resulting polymer composition will vary from 10% to 50% by weight based on the total weight of vinyl chloride polymer and rigid polymer. More preferably, the rigid polymer will be present in amounts in the range of from 20% to 40% by weight.

The following Examples 33 to 35 illustrate the use of glass and a rigid polymer in reinforcing vinyl chloride polymers. The general procedures used to prepare and test the composites of Examples 27 to 32 are repeated here. The resulting composites in Examples 33 to 35 also contain 20% by weight of glass in order to allow a direct comparison of properties with the composites of Examples 33 to 35.

Examples 33.—This example uses the glass concentrate capsules of Example 3, which comprise about 50% by weight of glass and about 50% by weight of a styrene-acrylonitrile copolymer. The amount of acrylonitrile in the rigid copolymer is about 26% by weight based on the total weight of styrene and acrylonitrile. Test results for this composite are tabulated in Table IV below.

Example 34.—Example 33 is repeated here except that an additional 14% by weight, based on the total weight of glass and resin, of a 74% by weight styrene/26% by weight acrylonitrile copolymer is blended in to make the composite. Test results for this composite are tabulated in Table IV below.

Example 35.—Example 34 is repeated here except that an additional 14% by weight, based on the total weight of glass and resin, of an alpha-methylstyrene/styrene/acrylonitrile copolymer (60%/12%/28% by weight respectively) is used in place of the styrene acrylonitrile copolymer used in Example 34. Test results for this composite are tabulated in Table IV below.

In the following Table IV the data for Examples 31 and 32, which was previously reported in Table III, is included to facilitate comparison.

TABLE IV.—SUMMARY OF EXAMPLES 30 TO 35—COMPOSITES CONTAINING 20% GLASS

| Example [1] | Tensile, p.s.i. $\times 10^{-3}$ | Percent elongation | Modulus, p.s.i. $\times 10^{-5}$ | Heat dist. T., °C. (264 p.s.i.) | Izod impact, ft.-lbs./in. |
|---|---|---|---|---|---|
| 30 | 10.6 | 1.3 | 10.4 | 80 | 1.2 |
| 31 | 14.1 | 1.6 | 11.9 | 79.5 | 2.8 |
| 32 | 14.0 | 1.7 | 11.8 | 80 | 2.8 |
| 33 | 14 | 1.8 | 11.1 | 82 | 1.5 |
| 34 | 14.4 | 1.8 | 11.0 | 84 | 1.3 |
| 35 | 14.4 | 1.7 | 11.1 | 86.5 | 1.3 |

[1] Thermoplastic resin composition—percent by weight based on total weight of thermoplastic resin. Example 30=vinyl chloride/styrene/acrylonitrile (75/18.5/6.5); 31=vinyl chloride (100%); 32=vinyl chloride (100%); 33=vinyl chloride/styrene/acrylonitrile (75/18.5/6.5); 34=vinyl chloride/styrene/acrylonitrile (57.5/31.5/11.0); 35=vinyl chloride/αMe styrene/styrene/acrylonitrile (57.5/10.5/20/6/11.4).

The data in Table IV shows that the use of a rigid polymer in the improved process of the preent invention causes a significant increase in the heat distortion temperature of the resulting vinyl chloride polymer composite when the composite is prepared using the glass concentrate capsule described in Part One above (Examples 30 to 35). The same result is not obtained when the rigid polymer is blended in with the glass and vinyl chloride polymer component according to a process of the prior art (Example 30). Note that the other composite properties are also superior to the properties of those composites prepared according to the processes of the prior art.

The increase in the heat distortion temperature which is obtained in Examples 33 to 35 is especially important in those applications where the composite is subjected to elevated temperatures, as for example in appliance housings, automotive parts, containers and other packaging applications where the contents are introduced into the container or package while hot.

In addition, water absorption tests are run by soaking the composite in water at 80° C. (65° C. for vinyl chloride polymers) for 24 hours. After this time the sample is examined visually, the amount of water pickup is measured, and a tensile test is run on the wet sample. The test samples which are prepared using the glass concentrate capsules of the present invention, show less opaqueness, less water pickup and higher wet tensile strength than do the test samples from the other examples.

It would appear that the poorer water absorption test results, that were obtained in the composites which were prepared according to the processes of the prior art, are due to water wicking in along the glass fibers in the composite causing separation of the matrix from the glass with resulting numerous microcracks which causes opaqueness in the composite. Consequently, these composites absorb more water, exhibit more opaqueness and exhibit a greater decrease in tensile strength than those composites which are prepared from the glass concentrate capsules of the present invention. In the glass concentrate capsules used in the process of the present invention the individual strands and the microfibers making up the strands are encapsulated by the polymeric matrix. Thus, there is less wicking of water by the glass fibers, less water aborption, less opaqueness and greater retention of tensile strength. Moreover, it is observed, after burning off the resin matrix, that the glass fibers from the glass concentrate capsules of the present invention show far less fiber abrasion or damage due to mechanical processing in the extruding and molding operation. On the other hand, there is much greater fiber abrasion and damage in those composites which are prepared according to the processes of the prior art. Presumably, the polymeric coating around the individual microfibers and glass strands in the glass concentrate capsules of the present invention protects the fibers from damage and abrasion during mechanical processing of these materials. Consequently, the fibers are better able to reinforce the resulting composite thus giving it greater strength.

The foregoing theory in regard to the better properties of composites made according to the process of the present invention is set forth to explain the observed effects and is not intended that the scope of the invention should, in any way, be limited by this theory.

The composites which are prepared according to the improved process of the present invention are especially useful in the fabrication of molded and extruded parts for automobiles such as dashboards, moldings, trim, etc., refrigerators, radio and television cabinets. Other uses for these composites are found in household applicances, industrial applications and in general wherever high performance thermoplastic resin parts are required.

It will be obvious to those skilled in the art that many modifications may be made in the products and processes set forth above without departing from the scope of this invention.

What is claimed is:

1. Composites comprising glass fibers and a thermoplastic resin which are prepared by blending the thermoplastic resin with glass concentrate capsules comprising:
   (A) from 20 to 70% by weight of glass strands having a length in the range of from about ⅛ to about ¼ inch which strands comprise a plurality of microfibers; and
   (B) from 30 to 80% by weight of a thermoplastic resin matrix selected from the group consisting of poly(vinyl chloride) homopolymers and copolymers and polystyrene homopolymers and copolymers;

wherein the individual microfibers in the glass strands are encapsulated within the thermoplastic resin matrix, wherein the individual glass strands are encapsulated within the thermoplastic resin matrix and arranged in a substantially collimated array which is encapsulated within the thermoplastic resin matrix; and then thermally processing the blend to form the composite.

2. Composites as in claim 1 wherein the thermoplastic resin is a styrene polymer and wherein the thermoplastic resin matrix in the capsule is a styrene polymer.

3. Composites as in claim 2 wherein the thermoplastic resin is a vinyl chloride polymer and the thermoplastic resin matrix in the capsule is rigid polymer having a $T_g$ of at least 105° C.

4. Composites as in claim 3 wherein the thermoplastic resin matrix is a copolymer of styrene and acrylonitrile containing from 18% to 32% by weight of acrylonitrile.

5. In the process for preparing composites from glass fibers coated with a polymeric material and a thermoplastic resin wherein the coated glass fibers and thermoplastic resins are blended and then thermally processed into a composite, the improvement which comprises using as the coated glass fiber component glass concentrate capsule comprising 10 to 80% by weight of glass strands having a length in the range of from 1/32 to 3/4 inch which strands are arranged in a collimated array and encapsulated within a thermoplastic resin matrix, wherein the individual fibers in the strands, the individual strands in the collimated array and the collimated array of glass strands are encapsulated in the thermoplastic resin matrix.

6. The process of claim 5 wherein the capsules have a particle size such that they pass through a 2.5 U.S. Standard Screen and are retained on a 40 U.S. Standard Screen.

7. The process of claim 6 wherein the glass concentrate capsule are prepared from glass strands having a length of from about 1/8 inch to about 1/4 inch.

8. The process of claim 6 wherein the glass concentrate capsules containing from 20 to 70% by weight of glass strands.

9. In the process for preparing composites from glass fibers coated with a polymeric material and a thermoplastic resin wherein the coated glass fibers and thermoplastic resin are blended and then thermally processed into a composite, the improvement which comprises using as in the coated glass fiber component glass concentrate capsules comprising
(A) from 20 to 70% by weight of glass strands having a length in the range of from about 1/8 to about 1/4 inch which strands comprise a plurality of microfibers; and
(B) from 30 to 80% by weight of a thermoplastic resin matrix selected from the group consisting of poly(vinyl chloride) homopolymers and copolymers and polystyrene homopolymers and copolymers;
wherein the individual microfibers in the glass strands are encapsulated within the thermoplastic resin matrix, wherein the individual glass strands are encapsulated within the thermoplastic resin matrix and arranged in a substantially collimated array which is encapsulated within the thermoplastic resin matrix; and wherein the capsules have a particle size such that they pass through a 2.5 U.S. Standard Screen and are retained on a 40 U.S. Standard Screen.

10. The process of claim 9 wherein the resin matrix in the glass concentrate capsules is a copolymer of styrene and at least one other monomer.

11. The process of claim 9 wherein the resin matrix in the glass concentrate capsules is a copolymer of styrene and acrylonitrile.

12. The process of claim 9 wherein the resin matrix in the glass concentrate capsules is a copolymer of styrene, acrylonitrile and methacrylic acid.

13. The process of claim 9 wherein the resin matrix in the glass concentrate capsules is polyvinyl chloride.

14. The process of claim 9 wherein the resin matrix in the glass concentrate capsules is a copolymer of polyvinyl chloride and at least one other monomer.

15. In the process for preparing composites from glass fibers coated with a polymeric material and vinyl chloride polymers wherein the coated glass fibers and vinyl chloride polymers are blended and then thermally processed into a composite, the improvement which comprises using as the coated glass fiber component glass concentrate capsules comprising:
(A) from 20 to 70% by weight of glass strands having a length in the range of from about 1/8 to about 1/4 inch which strands comprise a plurality of microfibers; and
(B) from 30 to 80% by weight of a thermoplastic matrix selected from the group consisting of rigid polymeric materials having a glass transition temperature greater than 105° C. and a solubility parameter which is within one unit of the solubility parameter of the vinyl chloride polymer;
wherein the individual microfibers in the glass strands are encapsulated within the thermoplastic resin matrix, wherein the individual glass strands are encapsulated within the thermoplastic resin matrix and arranged in a substantially collimated array which is encapsulated within the thermoplastic resin matrix; and wherein the capsules have a particle size such that they pass through a 2.5 U.S. Standard Screen and are retained on a 40 U.S. Standard Screen.

16. The process of claim 15 wherein the resin matrix in the glass concentrate capsule is a copolymer of styrene and at least one other monomer.

17. The process of claim 15 wherein the resin matrix in the glass concentrate capsule is a copolymer of styrene, acrylonitrile and methacrylic acid.

18. The process of claim 15 wherein the resin matrix in the glass concentrate capsules is a copolymer of styrene and acrylonitrile wherein the amount of acrylonitrile in the copolymer is in the range of from 18 to 32% by weight.

References Cited

UNITED STATES PATENTS

| | | | |
|---|---|---|---|
| 2,877,501 | 3/1959 | Bradt | 264—261 |
| 2,881,732 | 4/1959 | Chrystman | 117—126 GR |
| 3,022,210 | 2/1962 | Philipps | 161—170 |
| 3,119,718 | 1/1964 | Bradt | 117—126 GR |
| 3,274,136 | 9/1966 | Glesner et al. | 117—126 GR |
| 3,312,569 | 4/1967 | Philipps et al. | 161—175 |
| 3,403,069 | 9/1968 | Benson | 161—176 |

ROBERT F. BURNETT, Primary Examiner

R. L. MAY, Assistant Examiner

U.S. Cl. X.R.

117—126 GR; 161—176; 264—261